United States Patent
Burklund et al.

[11] 4,004,764
[45] Jan. 25, 1977

[54] DROGUE CHUTE EXTRACTION

[75] Inventors: Vernon D. Burklund; W. James Stone, both of China Lake; Joseph A. Schmidt, Ridgecrest, all of Calif.

[73] Assignee: The United States of America as represented by the Secretary of the Navy, Washington, D.C.

[22] Filed: May 13, 1974

[21] Appl. No.: 469,739

[52] U.S. Cl. .............................. 244/149; 244/241
[51] Int. Cl.² .................................... B64D 17/72
[58] Field of Search .......... 244/149, 141, 145, 147

[56] References Cited
UNITED STATES PATENTS

| 3,436,037 | 4/1969 | Stanley | 244/149 X |
| 3,596,856 | 8/1971 | Drew | 244/145 |
| 3,622,109 | 11/1971 | Drew | 244/147 |

Primary Examiner—Trygve M. Blix
Assistant Examiner—Barry L. Kelmachter
Attorney, Agent, or Firm—R. S. Sciascia; Roy Miller; Thomas W. Hennen

[57] ABSTRACT

A drogue parachute deployment system for an ejection seat comprises a drogue parachute mounted in a bag on the seat, a rocket motor, and a tow line attached between the parachute and the rocket motor. Upon firing of the rocket motor, the bag is caused to rip and the parachute is deployed.

4 Claims, 5 Drawing Figures

DROGUE CHUTE EXTRACTION

BACKGROUND OF THE INVENTION

1. Field of the Invention.

This invention relates to means for deploying drogue chutes. More particularly, this invention relates to the deployment of a drogue parachute with a rocket motor.

2. Description of the Prior Art.

The deployment of drogue or pilot parachutes (small parachutes which are, in turn, utilized to deploy other parachutes) by means of explosively fired slugs is well known. Aircraft escape systems and the like which utilize explosively fired slugs to deploy drogue chutes have certain drawbacks which those concerned with aircraft design would like to avoid.

A primary drawback of an escape system which utilizes an explosively fired slug to deploy the drogue chute is the weight of the slug itself and of the paraphernalia required to fire it. A typical slug weighs approximately one pound. The slug requires an explosive device to fire it and this adds weight to the system. The explosion required to launch the slug causes recoil which requires reinforcement of the platform (generally an aircraft seat) from which the slug is fired and the necessary reinforcement naturally adds weight to the system. In the prior art, in systems wherein explosively fired slugs have been utilized in the deployment of drogue chutes, the slug along with its required firing and reinforcing material has generally weighed at least 5 pounds. A weight of 5 pounds is significant in aircraft design.

Another drawback of an escape system or the like in which an explosively fired slug is utilized in drogue chute extraction is the time it takes for deployment of the chute. The best of such systems requires on the order of one half second, after activation of the explosive, for full deployment of the drogue chute. One half second is, in some cases, undesirably slow.

Main parachutes have, in the prior art, been deployed by means of rockets. However, in escape systems wherein rockets have been so used, the rockets have been relatively large and fairly complicated packaging means have been required.

SUMMARY OF THE INVENTION

In the present invention, a drogue chute is packaged in a bag which will rip off under a predetermined force and the bag is attached to a tow line which is, in turn, attached to a rocket mounted in a launcher attached to an aircraft seat. The thus packaged drogue chute is encased in a second outer bag mounted on an aircraft seat below a conventional main parachute. When the rocket is fired and the tow line deploys, the tow line rips open the outer bag. Upon continued deployment, the inner bag which contains the drogue chute is pulled out of the outer bag. When force applied to the tow line by the rocket exerts the predetermined force on the inner bag, the bag is ripped off of the drogue chute and the drogue chute deploys. The drogue chute which is attached to the main parachute or, in some cases, a second drogue chute, is then utilized to deploy the chute to which it is attached.

DESCRIPTION OF THE PREFERRED EMBODIMENTS

Figure 1:
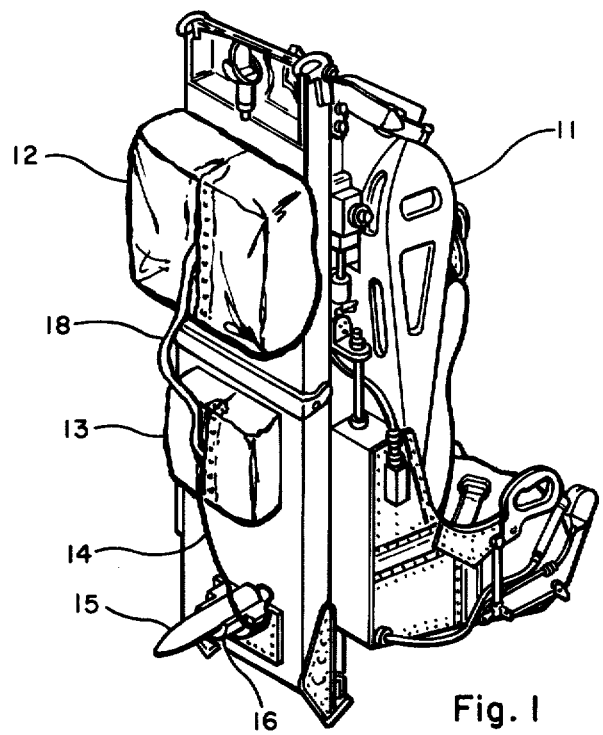
FIG. 1 is a perspective view of an aircraft seat having apparatus according to this invention attached.

The Figures of the drawing can be most easily utilized to describe the drogue chute deployment system of this invention.

FIG. 1 depicts an aircraft seat 11 which has been ejected from an aircraft by any suitable means and which is traveling through the air. The seat 11 would ordinarily have an aircraft crew member (not shown) sitting in it.

Attached to the back of the seat by any suitable means is a main parachute package 12. Attached to the seat below main parachute package 12 is a drogue chute package 13 according to this invention. Attached by one end to a bag around the drogue chute (within package 13 and not shown in FIG. 1) and by its other end to rocket 15 is a tow line 14. The rocket 15 is mounted in a launcher 16 which is mounted on the seat. The drogue chute within package 13 is attached by attachment means 18 to the main parachute in package 12.

Figure 2:
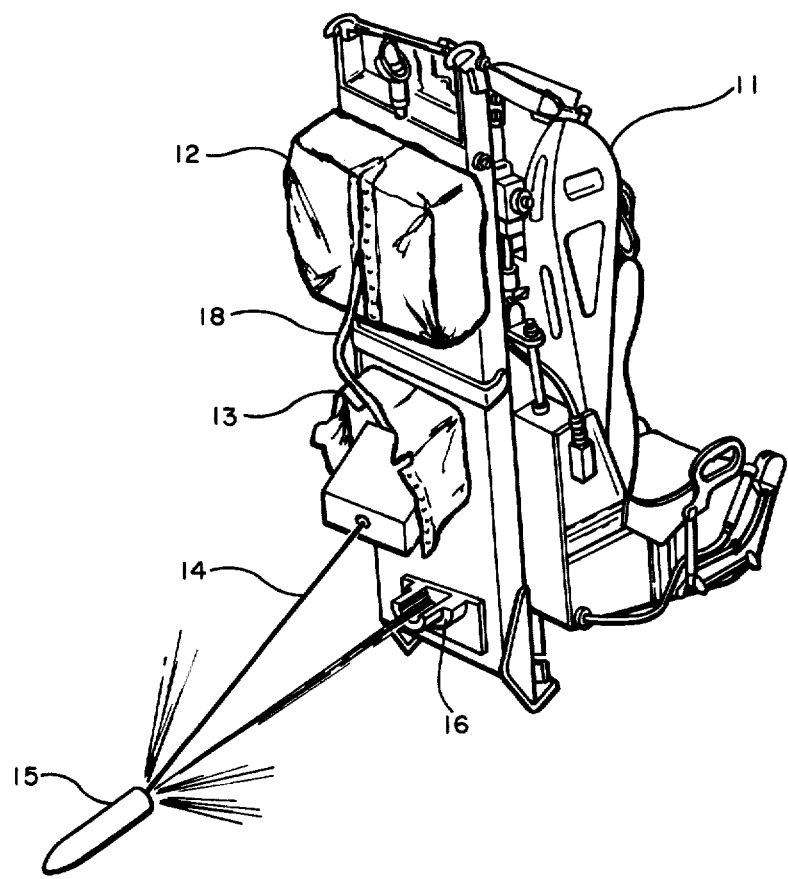
FIG. 2 is a perspective view of the seat and apparatus of FIG. 1 with the apparatus in operation.

FIG. 2 depicts the same parts as FIG. 1. The rocket 15 has been launched by any suitable means and is flying away from seat 11. The tow line 14 has ripped open package 13 by means of a cutting action. There are many ways by which tow line 14 may be threaded through package 13 so that the package will be ripped open when rocket 15 is launched.

Figure 3:
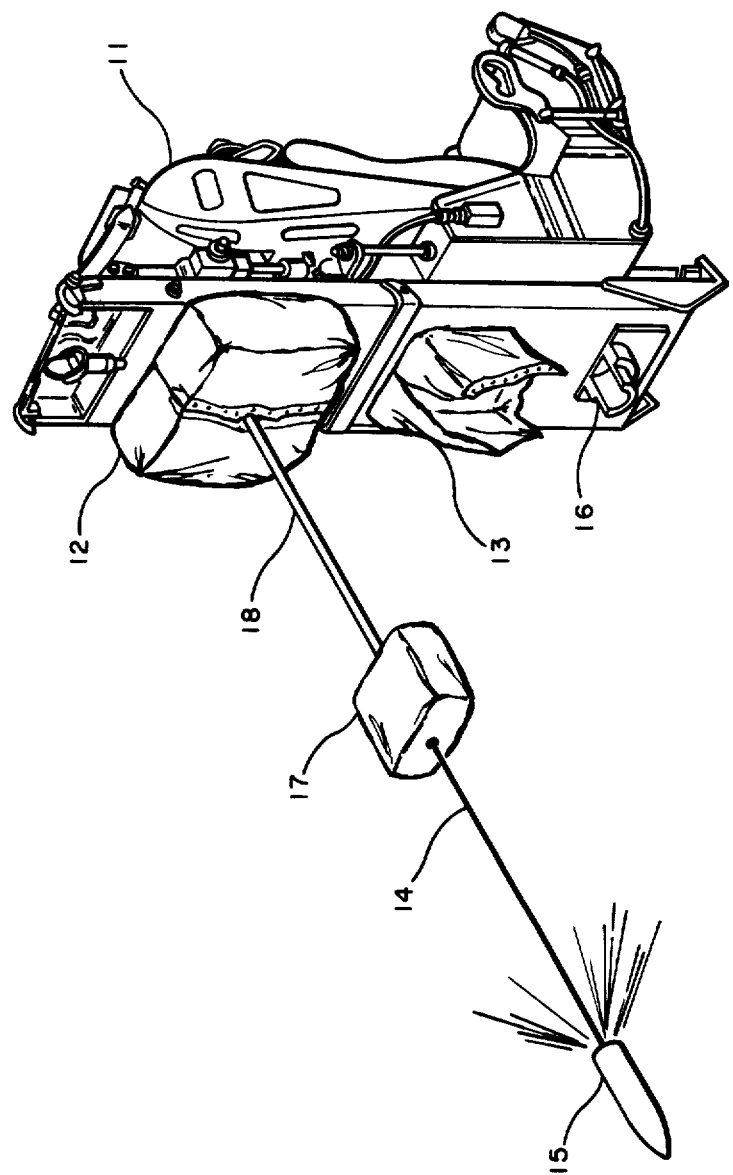
FIG. 3 is a perspective view of the seat and apparatus of FIG. 1 with the apparatus in a more advanced stage of operation than that shown in FIG. 2.

FIG. 3 depicts rocket 15 after it has traveled further away from seat 11. The drogue chute with bag 17 has been extracted from package 13. Suitable attachment means 18 for attaching the drogue chute to the main parachute are depicted as extending from bag 17 to the main chute which is still in package 12.

Figure 4:
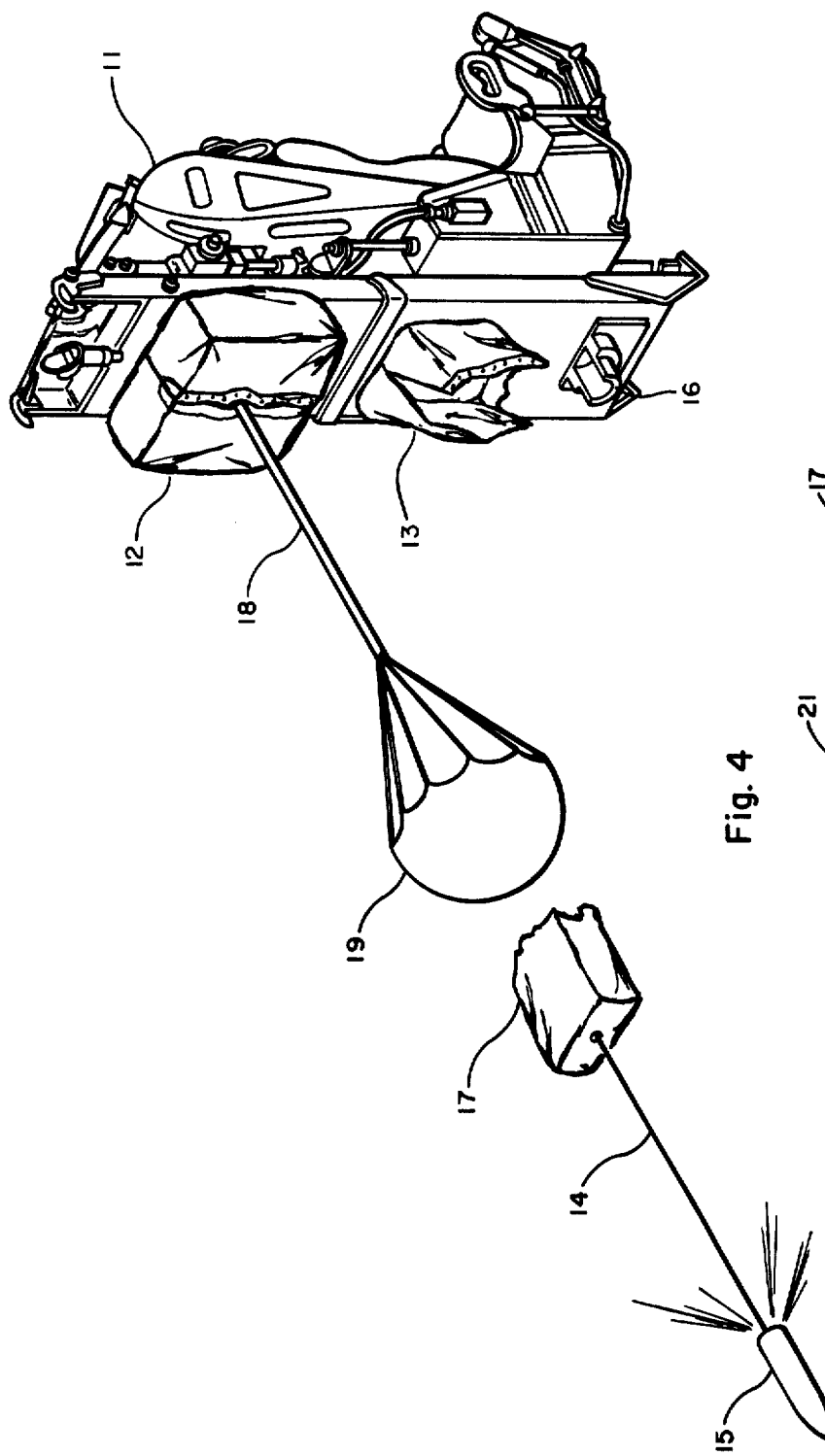
FIG. 4 is a perspective view of the seat and apparatus of FIG. 1 with the apparatus in a more advanced stage of operation than that shown in FIG. 3.

FIG. 4 depicts rocket 15 after it has traveled still further from seat 11. A predetermined amount of force has been applied, through tow line 14 to stitching in bag 17 and the bag 17 has ripped off of drogue chute 19. Drogue chute 19 is deployed and is now in the process of deploying main chute 12 by means of force exerted through attachment means 18.

In tests of apparatus according to this invention, plastic bags have been used as both the outer package 13 and the inner bag 17 in which the drogue chute is contained. However, other materials could be used with equal facility.

In tests, the inner bag 17 was sewn with nylon thread capable of withstanding the force necessary to pull the bag (and the chute within it) away from the seat but which gave away when increased force was applied by the rockets continued travel away from the seat. However, thread made from materials other than nylon could be used. Also, rather than being sewn, bag 17 could be fastened around the chute with an adhesive which was strong enough to remain intact during initial extraction of the bag and which would give away upon continued application of force. If the bag is sewn, the strength of the thread will be dictated by the force exerted by the rocket and the weight of the parachute.

It will be apparent to those skilled in the art that there are many ways by which tow line 14 can be threaded through package 13 so that the package is ripped open when the rocket is fired. It will also be apparent how to use attachment means 18 to open main parachute package 12.

Rocket 15 may be activated in any of several different ways. For example, it may be manually initiated by the crew member sitting in the seat or, by using state of the art technology, it can be designed so that it automatically fires at a predetermined time after the seat is ejected. It will be apparent that automation is preferable to a firing means wherein the crew member must play a part because there is always a chance that the crew member may be unable to perform his function.

In tests, a small rocket with three diverging nozzles was used. The tow line was steel and was attached, by means of a clevis, to a central point on the base of the rocket in a manner whereby hot exhaust gases flowed outwardly away from it. However, there are many ways by which the tow line could be attached to the rocket and materials other than steel could be used.

The launcher is merely a slotted tube with an integrally attached base plate to provide means for mounting it on the seat. When the rocket is launched, the tow line slides easily through the slot. In tests, no fraying due to friction between the tow line and launcher was observed. Also, heat produced by the ignited rocket had no deleterious effect on the tow line.

The total weight of the rocket and launcher used in tests was on the order of 0.50 pound as compared to five pounds for a slug deployed drogue chute. Full deployment of the drogue chute with apparatus according to this invention takes on the order of 250 milliseconds as compared with 500 milliseconds for slug deployed drogue chutes.

Figure 5:
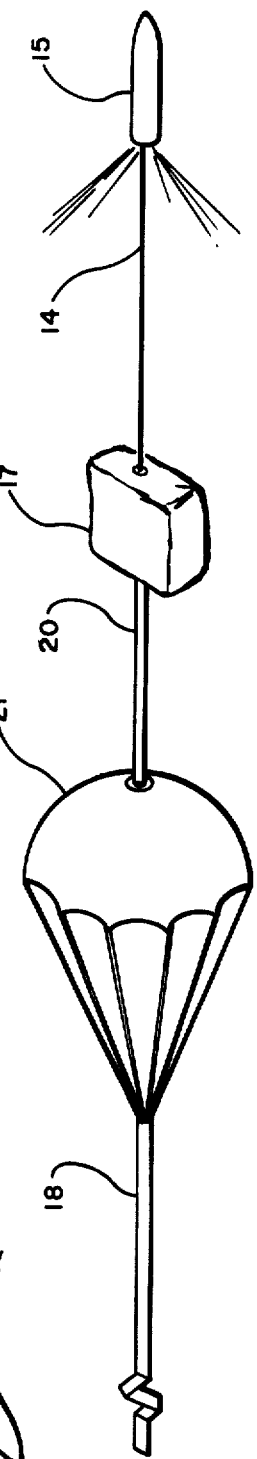
FIG. 5 is a schematic perspective view showing a second embodiment of the invention.

FIG. 5 shows, in schematic perspective, an embodiment of the invention which is somewhat different from that thus far described. As shown in FIG. 5, a rocket 15 attached to bag 17 (which holds drogue chute 19-not shown) is pulling, not only bag 17 but a second drogue chute 21 away from the main parachute (not shown in FIG. 5). The drogue chute in bag 17 is attached to drogue chute 21 by attachment means 20. In other words, rocket 15 is being used to deploy not one but two drogue chutes. In this embodiment, attachment means 20 may be a material having tensile strength such that if deployment takes place at high speed attachment means 20 will tear leaving drogue chute 21 as the sole means of deploying the main chute and if deployment takes place at low speed attachment means 20 will remain intact so that both drogue chutes may be utilized to deploy the main chute. Such arrangements are known in the art. The primary differences between the arrangement of this invention and those of the prior art lie in the use of a rocket to deploy the drogue chutes and in the use of bag 17. In the arrangement of FIG. 5, drogue chute 21 is, of course, packed in package 13 (see FIGS. 1-4) without a bag similar to bag 17 around it.

In tests wherein two drogue chutes (as shown in FIG. 5) were deployed, a rocket motor 3 inches long and 1.25 inches in diameter, containing 0.1 pound of solid propellant, developed a 70 pound pull over 0.25 second and deployed two drogue chutes plus tow line and attachment means weighing approximately 4.75 pounds. The rocket itself weighed only 0.35 pounds. The total weight of the rocket and launcher was 0.5 pounds.

Operation once the main parachute has been deployed has not been mentioned above because it has nothing to do with the invention. (The invention involves drogue chute deployment and, only secondarily, main chute deployment.) However, it will be obvious to those skilled in the art that the main parachute can be attached to the man by means of a parachute harness (not shown in the drawings) and that he and the main parachute can be separated from the seat when the main parachute is deployed.

What is claimed is:
1. A method for deploying a drogue parachute, said method comprising the steps of:
   igniting a rocket motor which is attached by means of a tow line to a closed bag containing a drogue parachute packed into the closed bag;
   pulling, by means of said rocket motor and said tow line, the bag and drogue parachute therein through the air; and
   ripping said bag off said drogue parachute through the action of said motor for releasing said drogue parachute into an air stream from said bag and said rocket motor.

2. Apparatus for deploying a drogue parachute comprising:
   a. a bag in which said drogue parachute is packed;
   b. a tow line attached by one end to said bag; and
   c. a rocket motor attached to the other end of said tow line; said bag being so constructed that when said rocket motor is fired and a predetermined amount of force is exerted on it through said tow line it will rip away from said drogue parachute and allow the drogue parachute to deploy.

3. Apparatus according to claim 2 wherein said rocket motor is in a launcher attached to the back of an aircraft seat.

4. Apparatus according to claim 3 wherein said bag in which the drogue parachute is packed is mounted on the back of an aircraft seat.

* * * * *